(12) United States Patent
Noto

(10) Patent No.: US 7,950,482 B2
(45) Date of Patent: May 31, 2011

(54) FUEL CELL SYSTEM AND VEHICLE USING FUEL CELL

(75) Inventor: Hironori Noto, Tokai (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 859 days.

(21) Appl. No.: 11/884,545

(22) PCT Filed: Feb. 28, 2006

(86) PCT No.: PCT/JP2006/004196
§ 371 (c)(1),
(2), (4) Date: Aug. 17, 2007

(87) PCT Pub. No.: WO2006/090922
PCT Pub. Date: Aug. 31, 2006

(65) Prior Publication Data
US 2008/0156554 A1 Jul. 3, 2008

(30) Foreign Application Priority Data

Feb. 28, 2005 (JP) .............................. 2005-053065

(51) Int. Cl.
*B60K 1/00* (2006.01)
(52) U.S. Cl. .................................. 180/65.31; 180/68.5
(58) Field of Classification Search ............... 180/65.31, 180/220, 68.5
See application file for complete search history.

(56) References Cited

U.S. PATENT DOCUMENTS

| 3,017,567 | A | * | 1/1962 | Barringer | 324/334 |
|---|---|---|---|---|---|
| 5,390,754 | A | * | 2/1995 | Masuyama et al. | 180/68.5 |
| 5,510,658 | A | * | 4/1996 | Nakayama | 307/10.1 |
| 6,184,762 | B1 | * | 2/2001 | Reiss et al. | 335/202 |
| 6,417,646 | B1 | * | 7/2002 | Huykman et al. | 320/122 |
| 6,648,085 | B2 | * | 11/2003 | Nagura et al. | 180/65.1 |
| 7,234,551 | B2 | * | 6/2007 | Horii | 180/65.1 |
| 7,469,759 | B2 | * | 12/2008 | Botzelmann | 180/65.28 |
| 2001/0004316 | A1 | * | 6/2001 | Denzene et al. | 361/816 |
| 2003/0137193 | A1 | * | 7/2003 | Belschner et al. | 307/9.1 |

FOREIGN PATENT DOCUMENTS

| JP | U 60-54380 | | 4/1985 |
|---|---|---|---|
| JP | U 60-54383 A | | 4/1985 |
| JP | 7-57759 A | | 3/1995 |
| JP | 07297746 A | * | 11/1995 |
| JP | 1117169 | * | 7/1999 |
| JP | 2001-210346 A | | 8/2001 |
| JP | 2002-216809 A | | 8/2002 |
| JP | 2002-362165 A | | 12/2002 |

(Continued)

*Primary Examiner* — Hau V Phan
*Assistant Examiner* — Bridget Avery
(74) *Attorney, Agent, or Firm* — Kenyon & Kenyon LLP

(57) ABSTRACT

In a fuel cell system in which a fuel cell case (14) houses a fuel cell stack (4) composed of a plurality of cells stacked on top of each other and a cell monitor board (11) for monitoring cell voltages of the fuel cell stack (4) and in which the fuel cell stack (4) is connected to a power converter such as an inverter in order to reduce the influence of the electromagnetic noise from the outside of the circuit board or from the circuit board on the outside and to achieve a stable operation of the fuel cell stack. The cell monitor board (11) is covered with a cell monitor cover (20) having high electromagnetic shield property. The cell monitor cover (20) is made of a conductor such as, for example, copper, iron, or aluminum.

9 Claims, 3 Drawing Sheets

FOREIGN PATENT DOCUMENTS

| | | |
|---|---|---|
| JP | 2002-367656 A | 12/2002 |
| JP | 2003-045458 A | 2/2003 |
| JP | 2003-257459 A | 9/2003 |
| JP | 2004-55384 A | 2/2004 |
| JP | 2004-103248 A | 4/2004 |
| JP | 2004-127779 A | 4/2004 |
| MX | PA01001261 A | 11/2002 |
| WO | WO 03/094260 A1 | 11/2003 |

\* cited by examiner

FUEL CELL SYSTEM AND VEHICLE USING FUEL CELL

This is a 371 national phase application of PCT/JP2006/304196 filed 28 Feb. 2006, claiming priority to Japanese Patent Application No. 2005-053065 filed 28 Feb. 2005, the contents of which are incorporated herein by reference.

TECHNICAL FIELD

The present invention relates to a fuel cell system and a vehicle equipped with the fuel cell system, and more particularly to an electromagnetic shield for a cell monitor circuit board of a fuel cell stack.

BACKGROUND ART

A solid polymer electrolyte fuel cell is composed of one or more layers of cells, each of which is composed of a membrane-electrode assembly (MEA) and separators, stacked on top of each other. More specifically, the fuel cell stack is formed by disposing terminals (electrode plates), insulators, and end plates at both ends of a cell stack in the cell stacking direction, clamping the cell stack in the cell stacking direction and fixing it to fastener members (for example, tension plates) that extend outside the cell stack in the cell stacking direction with bolts.

In order to operate the fuel cell stack stably, a cell monitor for monitoring cell voltages is fixed, for example, above the fuel cell stack. In some cases, the cell monitor is, for example, as disclosed in Japanese Patent Laid-Open No. 2004-127779, attached to an outer surface of a fuel cell case with its cell monitor circuit board housed in a case with waterproof seal. In other cases, it may be fixed above the fuel cell stack via a case plate and be housed in the fuel cell case together with the fuel cell stack.

DISCLOSURE OF THE INVENTION

When the fuel cell stack is connected to a power converter such as an inverter, the fuel cell stack emits electromagnetic noise generated from the power converter. The cell monitor (circuit board) may malfunction due to the influence of the electromagnetic waves. In addition, there is also a possibility that the electromagnetic noise emitted from the cell monitor causes malfunction of external electronic devices.

The present invention has been made in view of the above problems. Therefore, it is an object of the present invention to provide a fuel cell system capable of reducing the influence of the electromagnetic noise from the outside on the circuit board or from the circuit board on the outside so as to achieve a stable operation of the fuel cell stack and a vehicle equipped with the fuel cell system.

To solve the above problems, a fuel cell system according to the present invention has a fuel cell stack composed of a plurality of cells stacked on top of each other, a circuit board for monitoring cell voltages of the fuel cell stack, and a power converter connected to the fuel cell stack. The circuit board is covered with a cover having electromagnetic shield property.

Here, the term "having electromagnetic shield property" means having a shielding effect of at least 40 to 120 dB. In addition, monitoring cell voltages includes detecting the cell voltages.

According to this invention, the cover shields electromagnetic noise emitted from the outside of the circuit board such as electromagnetic waves emitted from the power converter via the fuel cell stack. Furthermore, it also prevents electromagnetic noise of the circuit board from being emitted to the outside thereof in reverse to the above.

Preferably, the cover is made of a conductor or a conductor layer is formed on the surface of the cover body, thereby achieving high electromagnetic shield property. In addition, the cover is preferably provided so as to overspread the substantially entire surface of the circuit board, thereby achieving higher electromagnetic shield property.

More preferably, the cover is made of impermeable material, thereby preventing dew condensation water generated around the circuit board (in the fuel cell case in the embodiment shown in FIGS. 1 to 3) from adhering to the circuit board.

According to the present invention, a vehicle equipped with a fuel cell system has one of the above configurations, and the cover is connected to the conductor on the vehicle side via a conducting portion. Here, the conducting portion can be one that directly connects the cover to the conductor (for example, a vehicle body or a vehicle frame) on the vehicle side so as to achieve continuity between them (for example, a conducting cable) or can be one including a conductive component (the metal fuel cell case or the like in the embodiment shown in FIGS. 2 and 3) among the components of the fuel cell system disposed between the cover and the conductor on the vehicle side.

According to the present invention, the cover overspreading the circuit board can be grounded (earthed) to the conductor on the side of the vehicle equipped with the fuel cell system via the conducting portion. Therefore, it is possible to increase the effect of reducing the influence of the electromagnetic noise and to improve the safety.

The circuit board is electrically connected to at least partial cells in the fuel cell stack via a cell monitor cable as wiring. In addition, the circuit board is indirectly or directly fixed to, for example, a frame or housing of the fuel cell stack via a bracket or the like. Here, the frame is for use in supporting the cell stack or gives a fastening power to the cell stack. For example, it can be an end plate, a tension plate, a tension bolt, or the like. On the other hand, the housing includes a member designed to protect the cell stack.

The fuel cell stack supplies power to an energy storage device (a battery or a capacitor) or a drive motor via a power converter (an inverter, a converter, or the like). These electric devices (the fuel cell, the power converter, the energy storage device, and the drive motor) are preferably covered with a case having electromagnetic shield property separately from and independently of each other, and the cable for supplying or receiving power between the electric devices is preferably a shielded cable. Furthermore, preferably the case and the shielded wire of the shielded cable are connected to the conductor of the common vehicle. This configuration further reduces the influence of the noise between the electric devices including the cell monitor (circuit board).

BEST MODE FOR CARRYING OUT THE INVENTION

Figure 1:
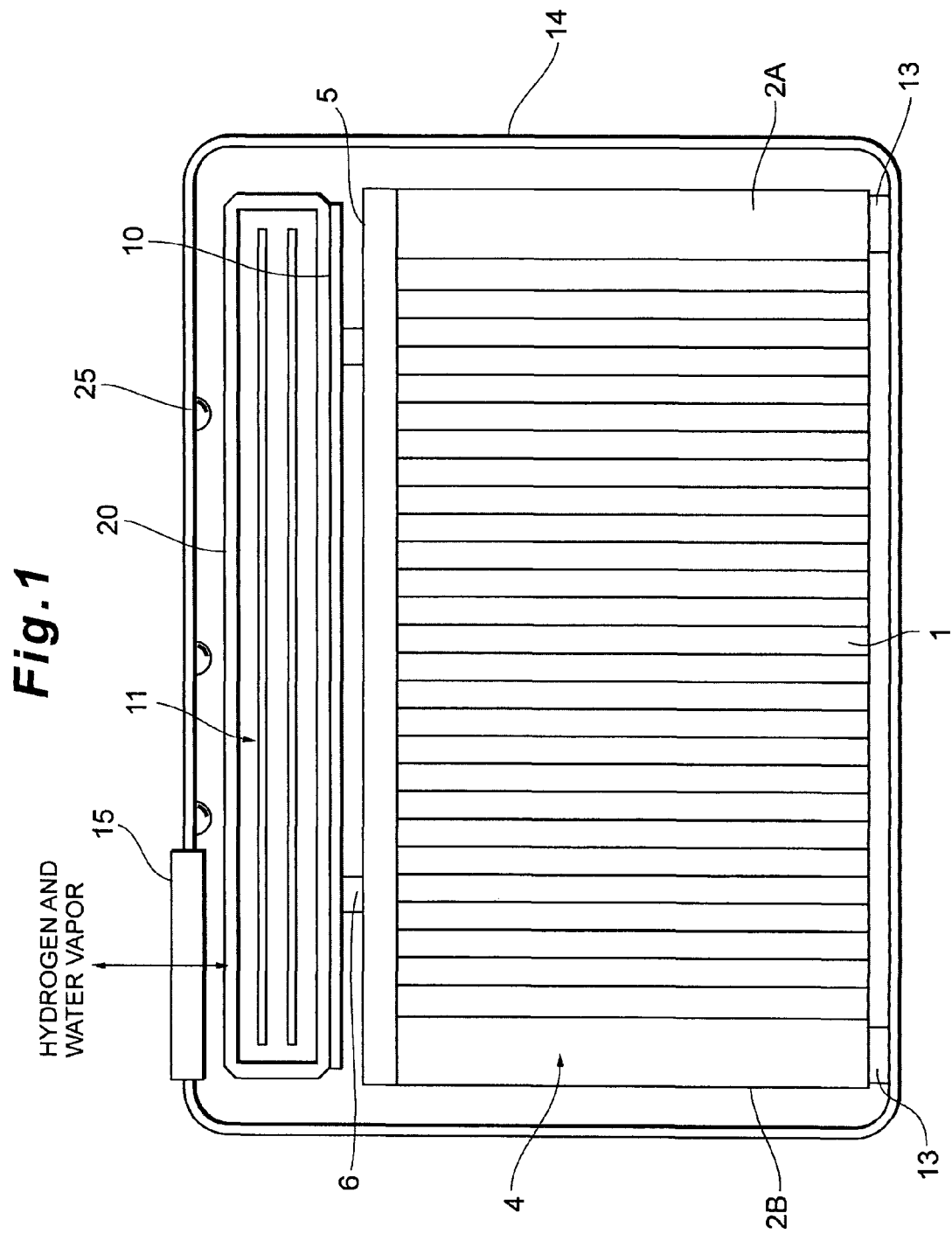
FIG. 1 is a side view showing a substantial part of a fuel cell system as one embodiment of the present invention.

One embodiment of the present invention will now be described below with reference to the accompanying drawings. FIG. 1 is a side view showing a fuel cell system. While the following description will be made with reference to a solid polymer electrolyte fuel cell, the present invention is not limited to the following embodiment.

The fuel cell stack in this embodiment is a solid polymer electrolyte fuel cell stack and is composed of one or more layers of cells, each of which is composed of a membrane-electrode assembly (MEA) and separators, stacked on top of each other. More specifically, the fuel cell stack is formed by disposing terminals (electrode plates), insulators, and end plates at both ends of the cell stack in the cell stacking direction, clamping the cell stack in the cell stacking direction and fixing it to fastener members (for example, tension plates) that extend outside the cell stack in the cell stacking direction with bolts.

In FIG. 1, a reference numeral 1 designates the cell stack clamped between the ends by end plates 2A and 2B, with the portion between the end plates 2A and 2B fastened by a tension plate 5, whereby the fuel cell stack 4 is formed. A case plate 10 is supported by a plurality of collars 6 above the fuel cell stack 4, and a cell monitor 11 (circuit board) for monitoring a cell voltage of each cell or each group of cells is fixed to the upper part of the case plate 10.

As described above, the cell monitor 11 is attached to the tension plate 5 via the collars 6 and the case plate 10 in this embodiment.

A reference numeral 13 designates a mount for supporting the fuel cell stack 4. The fuel cell stack 4 is housed in the fuel cell case 14 with being supported by the mounts 13, together with the cell monitor 11.

In addition, the fuel cell stack 4 is connected to a traction inverter (a power converter) and an auxiliary inverter (a power converter), which convert DC power supplied from both or one of the fuel cell stack 4 and a secondary battery to AC power (DC-AC conversion) and supply the AC power to a traction motor and an auxiliary motor, respectively.

Since a very small amount of hydrogen gas passes through the fuel cell stack 4, the fuel cell case 14 is provided with a ventilation film 15 for ventilation of the inside of the fuel cell case 14. The ventilation film 15 selects and passes only gas in order to prevent any liquid or foreign matter from getting inside. It is also possible to use a ventilation opening, a fan, a louver, or the like, instead of the ventilation film 15.

A reference numeral 20 designates a cell monitor cover (cover) for covering the cell monitor 11 separately from and independently of the fuel cell stack 4. The cell monitor cover 20 is made of material impermeable and having high electromagnetic shield property such as, for example, copper or copper-based alloy, iron or iron-based alloy, aluminum or aluminum-based alloy, or other conductor. The cell monitor cover 20, however, is not limited thereto, but can be provided with a conductive layer on the surface of the cover body made of resin or the like or can be made of conductive resin or the like.

The cell monitor cover 20 is provided so as to cover the whole of the cell monitor 11 except for a slot and the like for wires.

The fuel cell system of this embodiment has the above configuration. Therefore, even if electromagnetic noise is emitted from the outside of the cell monitor 11 toward the cell monitor 11 like electromagnetic waves or the like emitted from the power converter such as the inverter connected to the fuel cell stack 4 via the fuel cell stack 4, the electromagnetic noise can be shielded by the cell monitor cover 20.

In addition, it is also possible to prevent electromagnetic noise from being emitted from the cell monitor 11 to the outside in reverse to the above. Therefore, it is possible to prevent malfunction of the cell monitor 11 and electronic devices disposed in the outside thereof so as to achieve a stable operation of the fuel cell stack 4.

Meanwhile, a very small amount of hydrogen gas passes through the fuel cell stack 4, and therefore the fuel cell case 14 is provided with the ventilation film 15 for ventilation. Therefore, similarly to cases where a ventilation opening, a fan, a louver or the like is provided, an outside air is taken from the ventilation film 15 and water vapor enters the fuel cell case 14, which may lead to generation of dew condensation water 25.

In this embodiment, the cell monitor cover 20 is impermeable and therefore, even if the dew condensation water 25 drops after it is generated on the upper surface of the inner wall of the fuel cell case 14 as shown in the diagram, it is possible to prevent the dew condensation water 25 from directly adhering to the cell monitor 11. Therefore, the fuel cell stack 4 can be operated more stably with preventing the malfunction of the cell monitor 11.

Regarding a method of preventing dew condensation, it is possible to use a double structure for the fuel cell case 14, to use a hydrophilic upper surface of the fuel cell case 14 with the upper surface of the case 14 inclined to prevent the dew condensation water from dropping on the cell monitor 11, or to place thermal insulation material on the inner surface of the fuel cell case 14. Regarding a method of preventing the dew condensation water from adhering to the cell monitor 11, it is possible to use the cell monitor 11 molded in an impermeable material.

Figure 2:
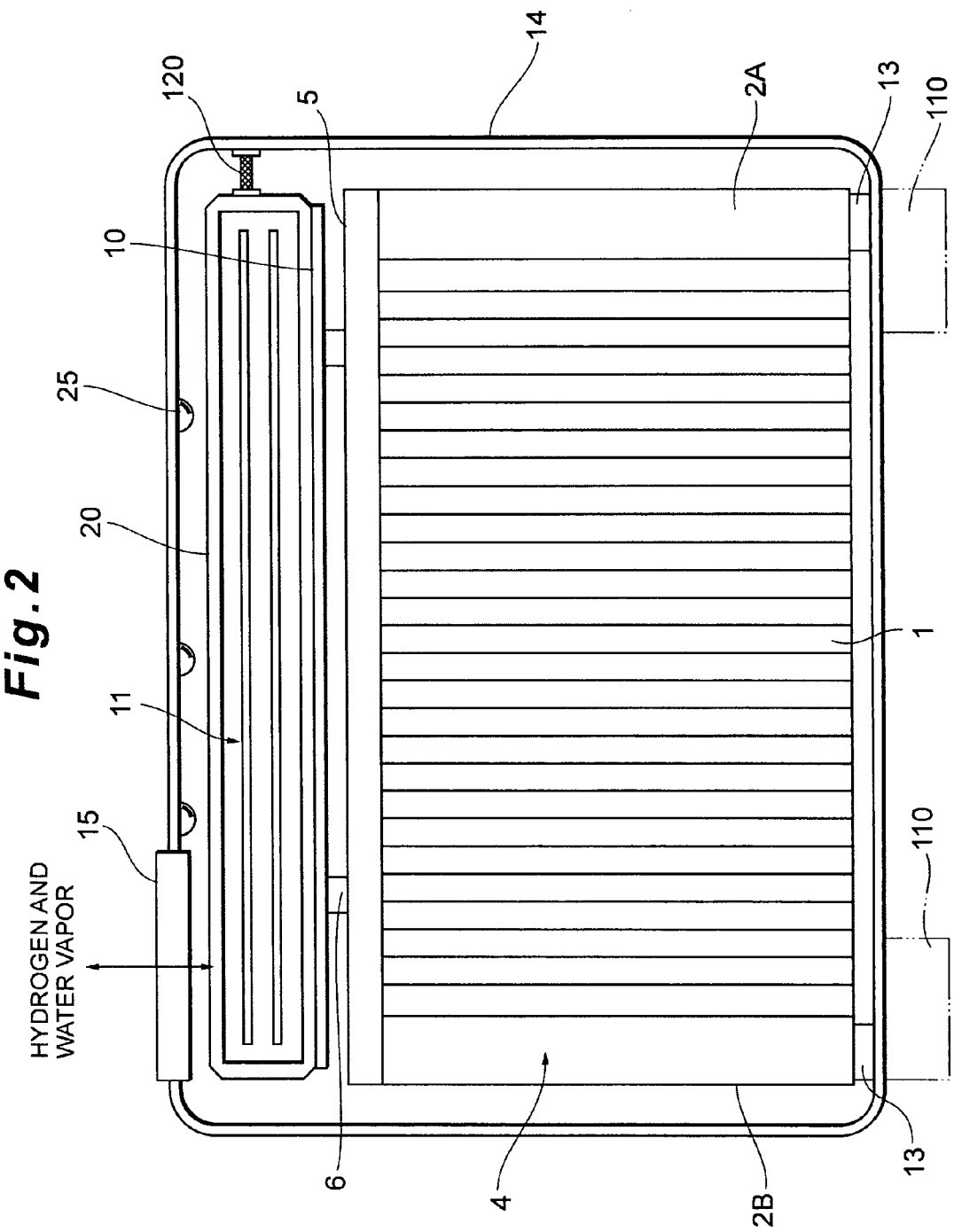
FIG. 2 is a side view showing a substantial part of a variation of the fuel cell system.
Figure 3:
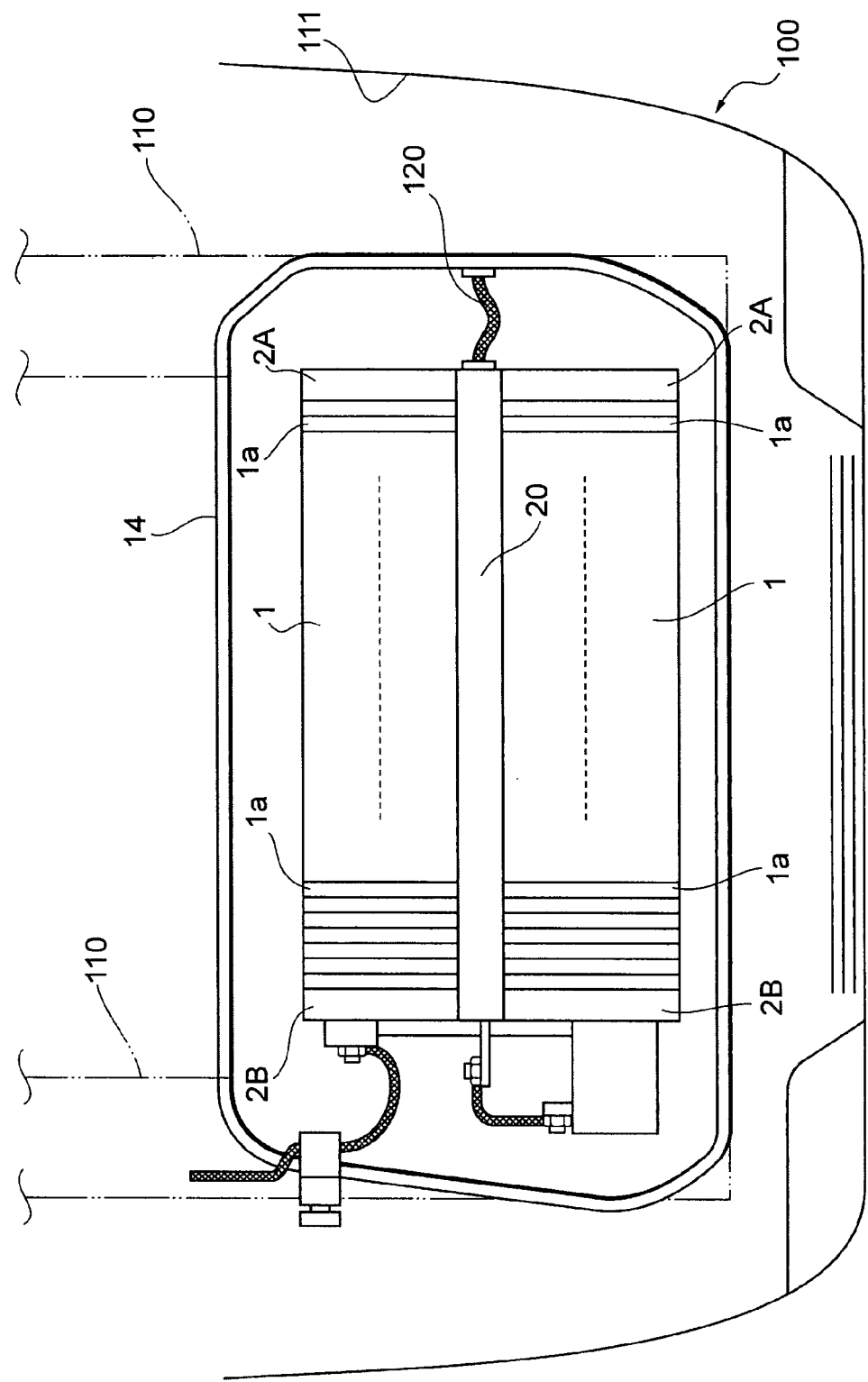
FIG. 3 is a sectional view showing an example of a condition in which a fuel cell case housing the fuel cell stack shown in FIG. 2 is mounted on the vehicle.

The following describes another embodiment of a fuel cell system according to the present invention and one embodiment of a vehicle equipped with the fuel cell system, with reference to FIGS. 2 and 3. Differences from the fuel cell system shown in FIG. 1 will be focused on in the following description.

In the fuel cell system and the vehicle 100 according to this embodiment, the cell monitor cover 20 made of the conductor impermeable and having high electromagnetic shield property is electrically connected to the fuel cell case 14 made of a conductor such as, for example, stainless steel or aluminum via a conducting cable 120.

In addition, the fuel cell case 14 is fixed to the top of a metallic vehicle frame 110 which is one of the conductors on the side of the vehicle 100 with fastening bolts which are not shown. Thereby, there is continuity between the cell monitor cover 20 and the vehicle frame 110 via the conducting cable 120 and the fuel cell case 14.

With the arrangement, according to the fuel cell system of this embodiment and the vehicle 100 equipped therewith, the cell monitor cover 20 covering the cell monitor 11 can be grounded (earthed) to the vehicle frame 110 which is the conductor on the side of the vehicle 100 via the conducting cable 120 which is a conducting portion and the fuel cell case 14. Therefore, it is possible to increase the effect of reducing the influence of the electromagnetic noise and to improve the safety.

While there is continuity between the cell monitor cover 20 and the vehicle frame 110 on the side of the vehicle 100 in this embodiment, the continuity can also be established between the cell monitor cover 20 and any other portion only if it is a conductor on the side of the vehicle 100 such as, for example, a vehicle body 111. In addition, there can be a component having electrical conductivity among the components of the fuel cell system between the cell monitor cover 20 and the conductor on the side of the vehicle 100, besides the fuel cell case 14 or instead thereof.

While the cell monitor (circuit board) 11 is placed inside the fuel cell case (stack case) 14 in this embodiment, the present invention is also applicable to an arrangement where the cell monitor (circuit board) 11 and the cell monitor cover (cell monitor case) 20 are provided outside the fuel cell case 14.

INDUSTRIAL APPLICABILITY

According to the present invention, the cover shields electromagnetic noise from the outside of the circuit board such as electromagnetic waves emitted from the power converter via the fuel cell stack and prevents electromagnetic noise of the circuit board from being emitted to the outside thereof. Therefore, it is possible to achieve a stable operation of the fuel cell stack while preventing malfunction of the cell board and the electronic devices disposed outside thereof.

Therefore, the present invention is widely applicable to fuel cell systems having the above demand and vehicles each equipped with the fuel cell system.

The invention claimed is:

1. A vehicle comprising:
 a fuel cell system, the fuel cell system including a fuel cell stack composed of a plurality of cells stacked on top of each other;
 a circuit board for monitoring cell voltages of the fuel cell stack; and
 a power converter connected to the fuel cell stack, and
 shielding enclosure that contains the circuit board, the shielding enclosure having electromagnetic shield property, wherein the shielding enclosure is grounded to a conductor on a side of the vehicle, the vehicle side being either a body or frame of the vehicle and
 wherein both the shielding enclosure and the fuel cell stack are contained within a stack case.

2. A vehicle according to claim 1, wherein the shielding enclosure further has impermeability.

3. A vehicle according to claim 1, wherein the shielding enclosure is connected to the conductor via a conducting portion.

4. A vehicle according to claim 1, wherein the stack case has electromagnetic shield property and is connected to the conductor on the vehicle side.

5. A vehicle according to claim 2, wherein the stack case has electromagnetic shield property and is connected to the conductor on the vehicle side.

6. A fuel cell system comprising:
 a fuel cell stack composed of a plurality of cells stacked on top of each other,
 a circuit board for monitoring cell voltages of the fuel cell stack,
 a power converter connected to the fuel cell stack,
 a stack case that houses the fuel cell stack and has electromagnetic shield property; and
 a shielding enclosure that surrounds the entire circuit board in the stack case so as to shield electromagnetic waves emitted from the fuel cell stack to the circuit board,
 wherein both the shielding enclosure and the fuel cell stack are contained within the stack case.

7. A vehicle according to claim 6, wherein the shielding enclosure further has impermeability.

8. A vehicle according to claim 6, wherein the shielding enclosure is connected to the conductor via a conducting portion.

9. A vehicle according to claim 6, wherein the stack case has electromagnetic shield property and is connected to the conductor on the vehicle side.

* * * * *

UNITED STATES PATENT AND TRADEMARK OFFICE
CERTIFICATE OF CORRECTION

PATENT NO. : 7,950,482 B2  Page 1 of 1
APPLICATION NO. : 11/884545
DATED : May 31, 2011
INVENTOR(S) : Hironori Noto It is certified that error appears in the above-identified patent and that said Letters Patent is hereby corrected as shown below:

| Column | Line | |
|---|---|---|
| 5 | 29 | Before "shielding" insert --a--. |

Signed and Sealed this
Eighteenth Day of October, 2011

David J. Kappos
*Director of the United States Patent and Trademark Office*